(12) United States Patent
Lordahl

(10) Patent No.: US 10,947,709 B2
(45) Date of Patent: Mar. 16, 2021

(54) FAUCET CARTRIDGE REPAIR KIT FOR A SINGLE HANDLE FAUCET

(71) Applicant: Var E. Lordahl, Buffalo Grove, IL (US)

(72) Inventor: Var E. Lordahl, Buffalo Grove, IL (US)

( * ) Notice: Subject to any disclaimer, the term of this patent is extended or adjusted under 35 U.S.C. 154(b) by 28 days.

(21) Appl. No.: 16/419,601

(22) Filed: May 22, 2019

(65) Prior Publication Data

US 2020/0370286 A1    Nov. 26, 2020

(51) Int. Cl.
| E03C 1/04 | (2006.01) |
| B25B 15/00 | (2006.01) |
| B25B 27/24 | (2006.01) |
| F16K 31/524 | (2006.01) |

(52) U.S. Cl.
CPC .......... *E03C 1/0412* (2013.01); *B25B 15/008* (2013.01); *B25B 27/24* (2013.01); *F16K 31/524* (2013.01)

(58) Field of Classification Search
CPC ......... E03C 1/04; B25B 15/008; B25B 27/24; Y10T 137/6021
See application file for complete search history.

(56) References Cited

U.S. PATENT DOCUMENTS

| 3,780,758 A * | 12/1973 | DeVries | F16K 5/12 |
| | | | 137/454.6 |
| 4,651,770 A * | 3/1987 | Denham | F16K 3/08 |
| | | | 137/270 |
| 4,753,418 A * | 6/1988 | Brotcke | F16K 27/045 |
| | | | 251/288 |
| 4,793,375 A * | 12/1988 | Marty | F16K 3/08 |
| | | | 137/270 |
| 4,794,945 A * | 1/1989 | Reback | F16K 31/60 |
| | | | 137/315.12 |
| 4,823,832 A * | 4/1989 | Rodstein | F16K 3/08 |
| | | | 137/454.5 |
| 4,842,009 A * | 6/1989 | Reback | F16K 31/60 |
| | | | 137/315.15 |
| 5,316,818 A * | 5/1994 | Hilliard | B62D 7/16 |
| | | | 428/99 |
| 5,375,887 A * | 12/1994 | Johnson | E03C 1/021 |
| | | | 285/12 |
| 5,839,464 A * | 11/1998 | O'Hara | F16K 11/0787 |
| | | | 137/218 |
| 6,578,876 B2 * | 6/2003 | Guertin, Jr. | F16L 15/00 |
| | | | 285/148.19 |
| 7,114,515 B2 * | 10/2006 | Sponheimer | F16K 3/085 |
| | | | 137/454.2 |
| 9,091,045 B2 * | 7/2015 | Korb | F16K 3/34 |
| 2018/0299018 A1 * | 10/2018 | Yang | F16K 11/0787 |

* cited by examiner

*Primary Examiner* — Kevin R Barss
(74) *Attorney, Agent, or Firm* — Kajane McManus; Jeanette M. Braun; Braun IP Law, LLC

(57) ABSTRACT

A single handle faucet cartridge repair kit comprising a bonnet nut, an upper assembly comprising an outside body, a roll pin, a stem, and a stem cam, an engagement disc, a upper disc not comprising holes or throughbores, a lower disc comprising holes or throughbores, a bottom seal retainer, and a bottom seal. The single handle faucet cartridge repair kit can further comprise a wrench, lubricant, and a handle screw, wherein the handle screw comprises threading.

13 Claims, 3 Drawing Sheets

FAUCET CARTRIDGE REPAIR KIT FOR A SINGLE HANDLE FAUCET

FIELD

The present disclosure relates to a kit for repairing, rebuilding, and/or replacing parts in a cartridge of a single handle faucet installation.

BACKGROUND

A typical single handle faucet installation involves fastening a series of washers and nuts to a valve body on the underside of the deck and inserting the valve body in an opening in the sink deck. The valve cartridge is inserted in the valve body and another series of washers and nuts are mounted atop the sink deck on the valve body over the valve cartridge. During installation the valve cartridge must be tested for defects such as leakage and must be properly adjusted for torque and tension. If the torque is not properly adjusted, users of the faucet handle may have difficulty operating the handle and various components may subsequently loosen and become damaged or dislodge entirely causing water damage and even scalding if the hot water valve malfunctions. If the components are damaged, time, labor and money are lost and new parts must be obtained.

SUMMARY

According to the invention there is provided a single handle faucet cartridge repair kit comprising a bonnet nut, an upper assembly comprising an outside body, a roll pin, a stem, and a stem cam, an engagement disc comprising an upper disc without holes, a lower disc including holes, a bottom seal retainer, and a bottom seal. The single handle faucet cartridge repair kit can further comprise a wrench, lubricant, and a handle screw, wherein the handle screw is threaded.

DETAILED DESCRIPTION

Figure 1:
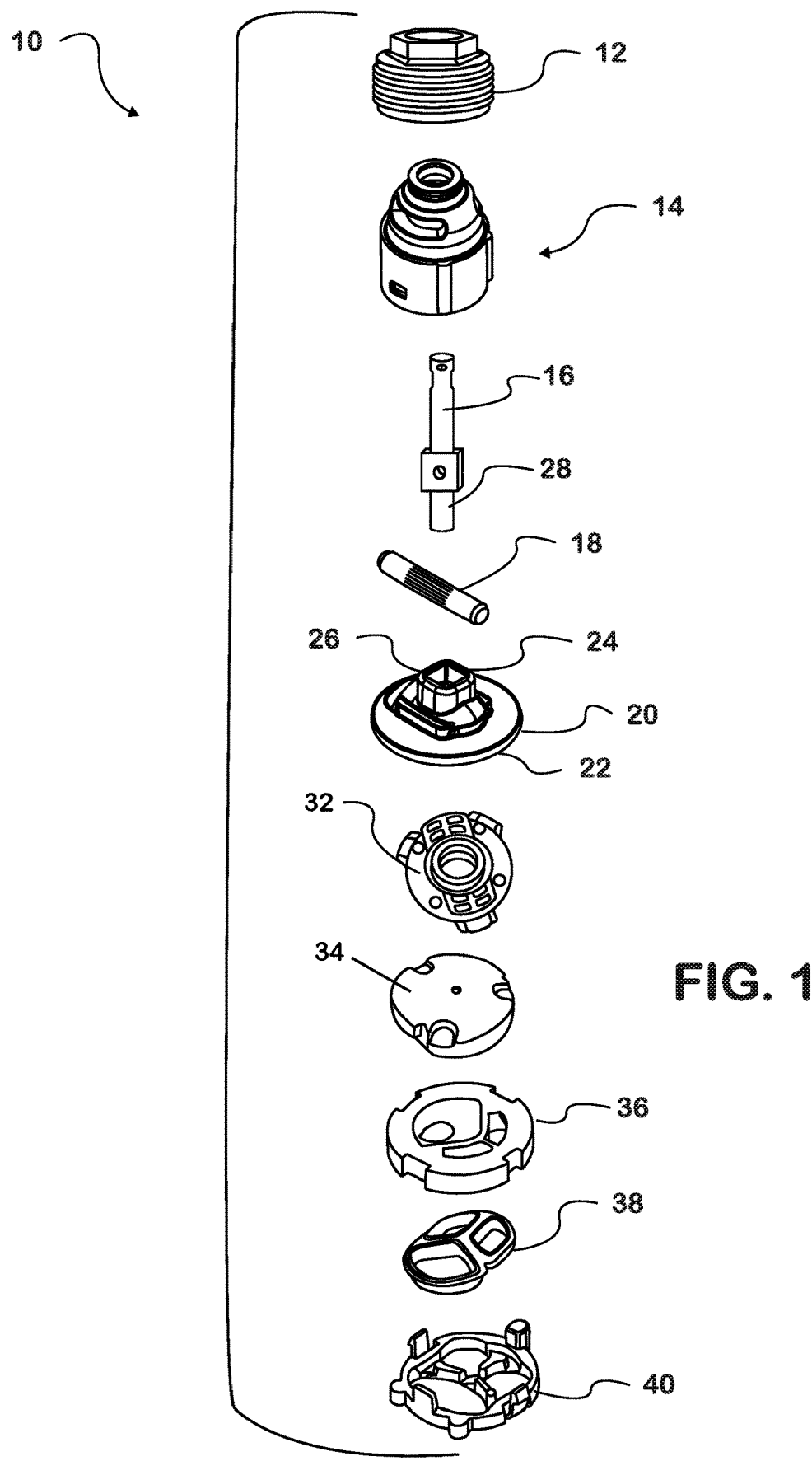
FIG. 1 is an exploded view of one embodiment of a kit for repairing or replacing parts in a cartridge of a single handle faucet installation.

The following detailed embodiments presented herein are for illustrative purposes. That is, these detailed embodiments are intended to be exemplary of the present invention for the purposes of providing and aiding a person skilled in the pertinent art to readily understand how to make and use of the present invention.

Accordingly, the detailed discussion herein of one or more embodiments is not intended, nor is to be construed, to limit the boundaries of the patent protection afforded the present invention, in which the scope of patent protection is intended to be defined by the claims and equivalents thereof. Therefore, embodiments not specifically addressed herein, such as adaptations, variations, modifications, and equivalent arrangements, should be and are considered to be implicitly disclosed by the illustrative embodiments and claims described herein and therefore fall within the scope of the present invention.

Further, it should be understood that, although steps of various claimed methods may be shown and described as being in a sequence or temporal order, the steps of any such method are not limited to being carried out in any particular sequence or order, absent an indication otherwise. That is, the claimed method steps are considered capable of being carried out in any sequential combination or permutation order while still falling within the scope of the present invention.

Additionally, it is important to note that each term used herein refers to that which a person skilled in the relevant art would understand such term to mean based on the contextual use of such term herein. To the extent that the meaning of a term used herein, as understood by the person skilled in the relevant art based on the contextual use of such term, differs in any way from any particular dictionary definition of such term, it is intended that the meaning of the term as understood by the person skilled in the relevant art should prevail.

Furthermore, a person skilled in the art of reading claimed inventions should understand that "a" and "an" each generally denotes "at least one," but does not exclude a plurality unless the contextual use dictates otherwise. Also, the term "or" denotes "at least one of the items," but does not exclude a plurality of items of the list.

This disclosure teaches a kit of parts or components for rebuilding, repairing, or replacing parts of a faucet cartridge for a single handle faucet in an existing faucet installation. In a faucet installation consisting of original manufacturer's equipment, the valve of the faucet installation conventionally has an upstanding valve stem the upper end portion of which is of non-circular, transverse cross-sectional configuration, with an underface of the faucet handle having a bore of complementary length and complementary transverse cross-sectional configuration and dimensions, so that with the upper end portion of the faucet valve stem disposed within the bore in the handle the handle is non-rotatably mounted at a pre-determined level on the valve stem and turning of the faucet handle results in turning of the valve stem and hence opening or closing of the faucet valve. The upper end portion of the faucet valve stem is generally of cylindrical form with the bore in the faucet handle being of corresponding length and cylindrical form.

Through use of the single handle faucet installation over an extended period of time, components of the faucet may become broken or otherwise damaged and this necessitates replacement of the faucet handle, unless of course the entire faucet valve and handle are replaced which is more expensive and in many cases unnecessary.

It is accordingly a primary object of the present invention to provide at least one replacement part to repair a single handle faucet cartridge. In accordance with the present invention there is provided a kit of parts which comprises components for rebuilding or repairing a single handle faucet cartridge comprising a bonnet nut, an upper assembly comprising an outside body, a roll pin, a stem, and a stem cam, an engagement disc, a upper disc not comprising holes, a lower disc comprising holes, a lower seal assembly comprising a bottom seal retainer and a bottom seal, and a handle screw, wherein the handle screw comprises threading.

The general inventive concept is not intended to be limited to the specific embodiments illustrated herein.

FIG. 1 is an exploded view of a single handle faucet cartridge rebuilding kit according to one embodiment of the present disclosure. As shown in FIG. 1, the exemplary single handle faucet cartridge repair kit 10 comprises a bonnet nut 12, outside body 14, a stem 16, a roll pin 18, and a stem cam 20. The stem cam 20 is top-hat shaped, wherein a bottom portion 22 of the stem cam 20 is flat and wider than a top portion 24, and the top portion 24 includes a through bore 26 that accepts a bottom portion 28 of the stem 16. The single handle faucet cartridge repair kit 10 further comprises an engagement disc 32 and an upper disk 34 that does not comprise holes or throughbores. The single handle faucet cartridge repair kit 10 may comprise an engagement disc 32 where the upper disc 34 is permanently attached to the engagement disc 32 or is removably attached to the engagement disc 32.

The single handle faucet cartridge repair kit 10 also comprises a lower disc 36, a bottom seal 38, and a bottom seal retainer 40. The lower disc 36 can comprise at least one hole or throughbore. The bottom seal 38 can be made out of rubber or another material that acts as a seal. The bottom seal 38 and bottom seal retainer 40 each include at least one hole, and preferably 3 holes. The bottom seal 38 can be nearly circular in shape. The bottom seal 38 is comprised of two flat sides, the flat sides being positioned opposite one another. The bottom seal 38 can also be seated inside the bottom seal retainer 40.

The components of the single handle faucet cartridge repair kit 10 can be made from hard materials that resist wear from use. Some examples of hard materials comprise metal, stainless steel, plastic, nylon, ceramic, or combinations thereof, though this list is not exhaustive. A person having ordinary skill in the art of repairing at least one broken component of a single handle faucet cartridge would understand what materials can be used to make the components of the single handle faucet cartridge repair kit 10.

Figure 2:
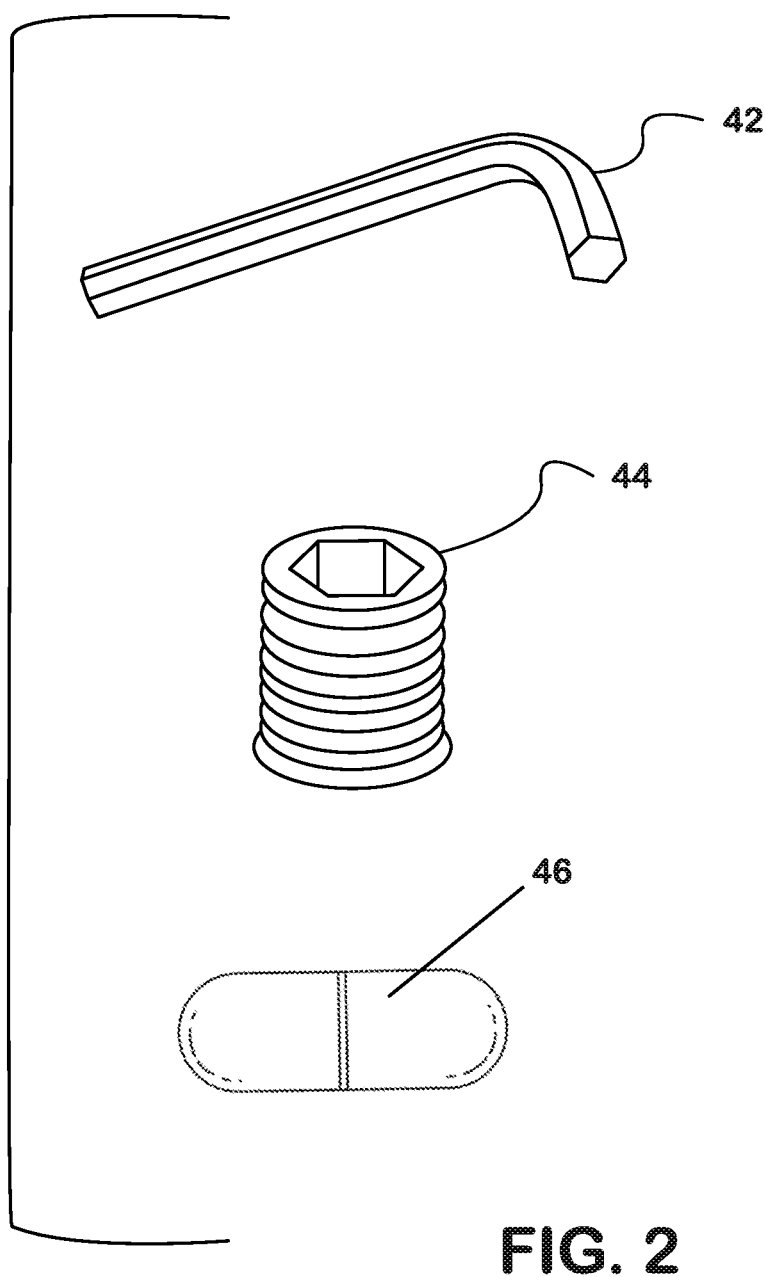
FIG. 2 is an exploded view of optional parts for kit for repairing or replacing parts in a cartridge of a single handle faucet installation.

Turning to FIG. 2 the single handle faucet cartridge repair kit 10 can further comprise, optionally, a wrench 42, a handle screw 44, and lubricant 46. The wrench 42 can be a hex key wrench and the lubricant 46 can be a silicone lubricant.

Figure 3:
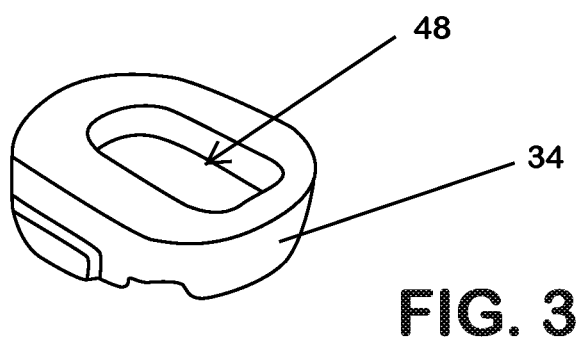
FIG. 3 illustrates one embodiment of the back side of the upper disc of the kit for repairing or replacing parts in a cartridge of the single handle faucet of claim 1.

Turning to FIG. 3, the back side of the upper disc 34 is shown. The back side of the upper disc 34 comprises a slot 48. The slot 48 does not create a bore through the upper disc 34.

Figure 4:
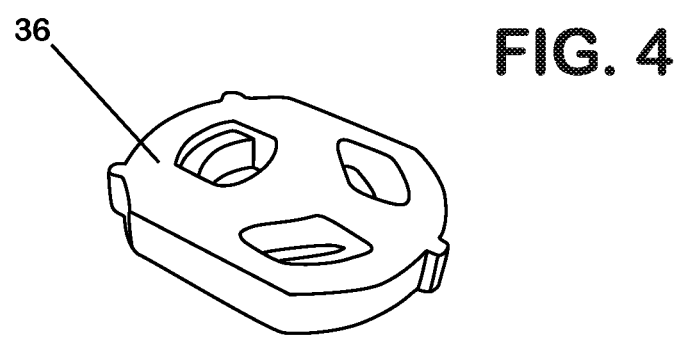
FIG. 4 illustrates one embodiment of the back side of the lower disc of the kit for repairing or replacing parts in a cartridge of the single handle faucet of claim 1.

Turning to FIG. 4, the back side of the lower disc 36 is illustrated.

To install any components of the single handle faucet cartridge repair kit 10 disclosed herein, the existing faucet handle will need to be removed first to expose the faucet cartridge contained therein. The existing cartridge and its components will have to be removed and analyzed to identify the malfunctioning component or components. Once at least one component is identified as malfunctioning, that component can be replaced by the corresponding component contained in the single handle faucet cartridge repair kit 10 described herein. If more than one component is malfunctioning, a plurality of components contained in the single handle faucet cartridge repair kit 10 can be used to replace the more than one damaged or broken part.

It is recognized that similar modifications can be made to single handle faucet cartridge rebuilding kit to aid in fixing a malfunctioning single handle faucet that are not specifically set forth herein. To the extent that any such variations do not materially change the design and/or function of the kit 10 as described, they are considered to be within the spirit and scope of the disclosure as defined in the claims.

I claim:

1. A single handle faucet cartridge repair kit, the single handle faucet cartridge repair kit comprising at least:
   a bonnet nut;
   an outside body;
   a roll pin;
   a stem;
   a stem cam;
   an engagement disc;
   an upper disc not comprising holes or throughbores;
   a lower disc comprising at least three holes or throughbores;
   a bottom seal retainer comprising at least three openings that align with the at least three holes or throughbores of the lower disc when engaged with a bottom seal; and
   a bottom seal comprising at least three openings that align with the at least three holes or throughbores of the lower disc with engaged with a lower disc.

2. The single handle faucet cartridge repair kit of claim 1, further comprising a wrench.

3. The single handle faucet cartridge repair kit of claim 1, further comprising lubricant.

4. The single handle faucet cartridge repair kit of claim 1, further comprising a handle screw.

5. The single handle faucet cartridge repair kit of claim 1, wherein said upper disc is made of ceramic.

6. The single handle faucet cartridge repair kit of claim 1, wherein the bottom seal is made of rubber.

7. The single handle faucet cartridge repair kit of claim 2, wherein the wrench is a hex key wrench.

8. The single handle faucet cartridge repair kit of claim 1, wherein the bottom seal is circular in shape, comprises two flat sides, wherein the two flat sides are on opposite sides of the bottom seal, and the bottom seal seats inside the bottom seal retainer.

9. The single handle faucet cartridge repair kit of claim 4, wherein the handle screw is threaded.

10. A single handle faucet cartridge repair kit, the single handle faucet cartridge repair kit comprising:
    a bonnet nut;
    an outside body;
    a roll pin;
    a stem;
    a stem cam;
    an engagement disc, the engagement disc comprising a upper disc not comprising holes and a lower disc comprising at least three holes or throughbores;
    a bottom seal retainer comprising at least three openings that align with the at least three holes or throughbores of the lower disc when engaged with a bottom seal; and
    a bottom seal comprising at least three openings that align with the at least three holes or throughbores of the lower disc with engaged with a lower disc;
    a wrench;
    lubricant; and
    a handle screw.

11. The single handle faucet cartridge repair kit of claim 10, wherein the bottom seal retainer is made of plastic.

12. The single handle faucet cartridge repair kit of claim 10, wherein the lubricant is silicone lubricant.

13. The single handle faucet cartridge repair kit of claim 10, wherein the stem and rolling pin are made out of metal.

* * * * *